Jan. 10, 1933.    M. W. COLLET    1,893,818
AUTOMATIC PARACHUTE PACK RELEASER
Filed Jan. 2, 1931

Inventor:
Mark W. Collet

Patented Jan. 10, 1933

1,893,818

UNITED STATES PATENT OFFICE

MARK W. COLLET, OF PHILADELPHIA, PENNSYLVANIA

AUTOMATIC PARACHUTE PACK RELEASER

Application filed January 2, 1931. Serial No. 506,143.

My device is intended for use in aviation for the purpose of producing automatically, during a fall, a movement of some instrumentality which should operate after the fall begins, but at a period before the aviator or apparatus would reach the ground. It is adapted for use in securing the opening of a parachute pack or any parachute container, whether the parachute be one for an individual for the plane or some portion of it, or for causing the opening of a parachute sail when inanimate objects are dropped from an aircraft and also for other purposes.

The apparatus depends for its operativeness on the fact that when any instrumentality is allowed to fall freely, the attraction of gravitation acts equally on all parts of it. Consequently, while falling freely, the attraction of the earth can produce no effect on the relations of the parts of the instrumentality towards each other. Consequently also, a weight that compresses or stretches an elastic medium, such as a spring or air, in an apparatus that is supported against the earth's gravitational pull, when this support is withdrawn and the apparatus falls substantially freely, will cease to do so, and the elastic medium will produce a movement, relative to each other, of the parts of the apparatus that would have been prevented from occurring when the apparatus was supported.

This relative movement of the parts by the elastic element of the apparatus can be utilized to move the instrumentalities needing to be moved to release the parachute during the fall. It can be made to operate immediately with the starting of the fall, or, by embodying a suitable braking mechanism, at a suitable time after the fall begins. The device is independent of position which it occupies while falling. It will operate equally whether on its side, or upright, or upside down. It is always ready for action and requires only, that, while in the aircraft, it remains fairly upright until brought into action.

Figure 1:
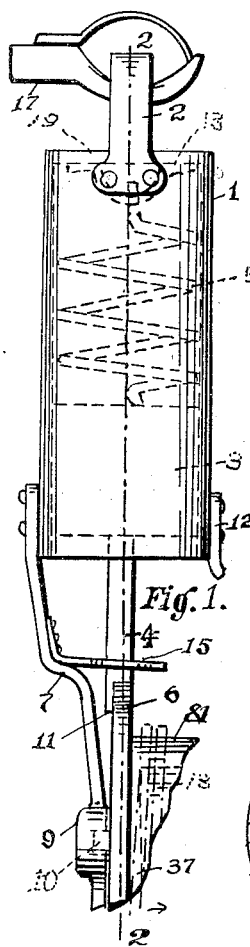
Figure 2:
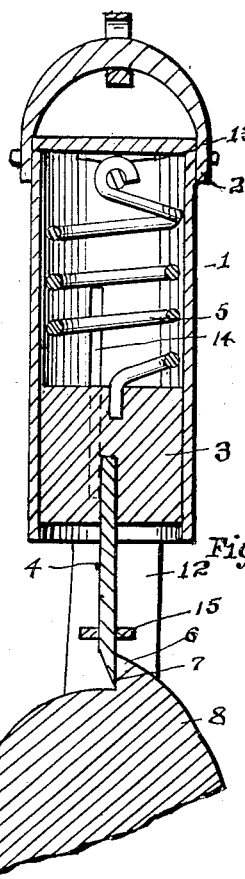
Figure 4:
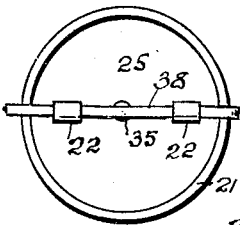
Figure 3:
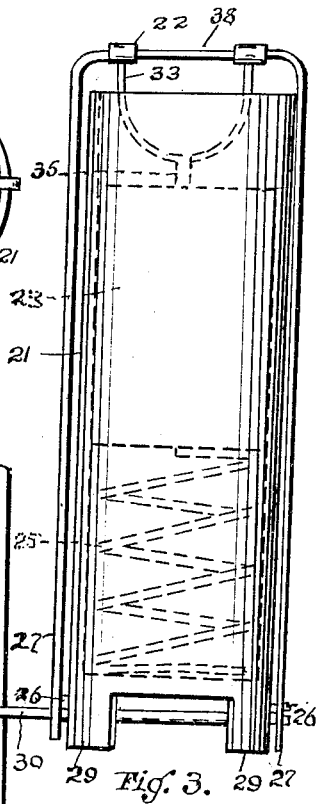
Figure 5:
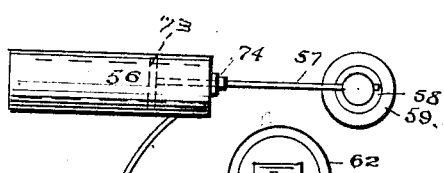
Figure 5:
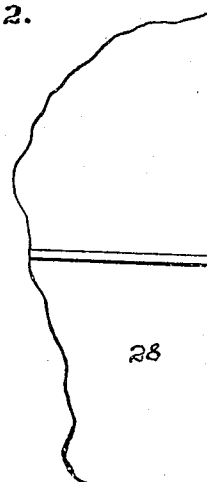
Figure 6:
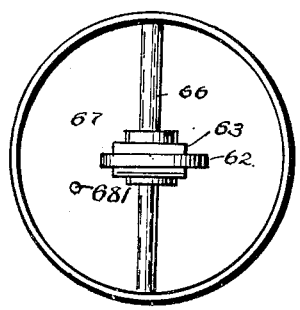

Fig. 1 is a side elevation of the type of my device where a spring is stretched by a weight when the device is supported against the earth's gravitation. Fig. 2 is a section on line 2—2 of Fig. 1. Fig. 3 is a side elevation of a type where the spring is pressed down by a weight when the device is so supported. Fig. 4 is a top plan of the device shown in Fig. 3. Fig. 5 is an elevation of a type of my device where the elastic medium is compressed air or gas. Fig. 6 is a top plan of the device shown in Fig. 5.

Describing first the type shown in Figs. 1 and 2:—A guide 1, preferably a tube, contains the weight 3 which stretches the spring 5 between it and the hanger 13, which is secured to the guide 1. The weight 3 carries the instrumentality which is moved by the retraction of spring 5, drawing towards each other the weight and the hanger. Figs. 1 and 2 show the weight provided with a downwardly projecting rod 4, provided with a detent 11, engaging with a tooth 6 on the wheel 8. A drum 81 with an actuating spring 18, turns the wheel 8 on journals 10 in the box 9 carried by the hangers 7 and 12, from the guide 2, thus positioning the wheel 8 permanently at a fixed distance from the hanger 13. A guide 15 may be used for the rod 4.

A hook 17 and a bail 2 attached to the guide 1, may be used to hold the weight and guide 1 substantially vertical. A brake can be arranged checking the drawing of the weight 3 and the hanger 13 by making the weight 3 fit closely enough to the walls of the guide 1 to prevent, to a great extent, the passage of air past the weight 3, and closing the top of guide 1 above the weight 1 by a stopper 19, and a braking of its movement momentarily followed by a rapid movement of the weight 3 by the spring 5 will occur if a port and bypass is provided, such as the channel 14, the lower extremity of which is covered by the weight when stretching the spring 5, but will be uncovered so soon as the bottom of the weight uncovers the lower end of the channel 14. In such case, when the device begins a free fall, the compression of the air in the upper part of the guide 1 will retard the movement of the weight 3 until its lower end clears the lower end of the channel 14, after which the rise of the weight 3 will be immediate and rapid. This type of my device will work well to open the pack of an individual aviator. The rip cord may be wound on drum 81, and a support forming practically a universal joint, permitting the device to swing freely, such as the hook 17 be fastened to the aviator's body. The arrangement described of the hook 17 and bail 2 will permit the device to swing sufficiently to keep the guide 1 substantially vertical or upright while the aviator is entering the machine and moving about in it. If he leaps from the machine, his free fall will loosen the detent 11 from the tooth 6 and allow the wheel 8 and drum 81 to revolve and wind up a rip cord 37 on the drum 81 and jerk open the fastenings on the pack, under the impulse of the spring 18.

Describing now the second type of my invented device which is shown in a form particularly applicable to apparatus dropped from an aircraft such as mail. Such devices usually have a parachute that is opened by admission of air into the sail of the parachute from below; after the fall starts the amount of air so admitted being regulated by valves or similar devices which in instances were regulated by clockwork.

In the form illustrated in Figs. 3 and 4. I have shown my device operating a butterfly valve 28. A tube 21 forms the guide in which the weight 23 moves, and is shown in Fig. 3 as at the release position, the weight being at the opening end of its travel and the butterfly valve 28 open. This form of my device has a link composed of two arms 27, 27, and a cross head 38 that by means of crank arms 26 turns the spindle 30. The link 33 is conveniently secured by the journal boxes 22 to the cross head 38, which may be in the form of a yoke with a central arm 35 that transfers the movement of the weight 23 to the link having the arms 27.

The spring 25 is seated on the closed bottom of the tube and presses on the bottom of the weight 23. The link 30 is positioned permanently at a fixed distance from the seat of the spring 25 very conveniently by carrying it in bearings in hangers 29, 29, formed by extending portions of the tube. The tube forming the guide 21 may fit closely enough around the weight 23 to prevent the seeping of any substantial amount of air between them, in which case the movement of the weight will be retarded and the valve 28 will open gradually after the free fall begins. When used with a mail drop, no means beyond fastening it to the apparatus is usually needful, as this apparatus usually stands upright on its base in the cock pit or other suitable part of the airplane. This type of my device can be provided with suitable hanging means such as the bail 2 and hook 17 of Fig. 1, or the parts 66, 63, 64 and 62 of Fig. 5, and can operate a detent with an assemblage similar to the parts 18, 8, 6 and 7 of Fig. 1. It can then be used in connection with the parachute pack of the single aviator.

A third type of my device is illustrated in Figs. 5 and 6. A container 51, preferably a tube, encloses a weight 53 that forms a piston movable thereon. It has, in practice, a seat 61 where the weight fits as nearly airtight as is practical. The space between the bottom of the weight and the end 69 of the container holds air or other gas under a substantial pressure, but insufficient to lift the weight 53 from its seat. This space has a valve 68 through which air can be forced. A stop formed of a closing plate 67 limits the movement of the weight 53. Stoppage of the movement of the weight 53 will maintain the air compression and is desirable. A port 60 above the seat 61 is connected by a tube 59, (usually a rubber tube) to drive a piston 73 connected to which is a spindle 75, that passes through a gland 74 in the cylinder 56 and acts as a pin holding down the gromet 58. The stoppage of the movement of the weight 53 maintains the air pressure beneath the weight to a sufficient extent to make the device operative.

Fig. 5 shows the device when the free fall has just begun. The weight 53, under the influence of the compressed air, has moved from its seat opening the port 60, and the piston 73 has drawn the end of the spindle 57 partly out of the cone 58. This type is especially adapted for releasing the envelope of a plane parachute. Such parachutes are generally carried above the fuselage and usually closed by several releasable fastenings, which may be simultaneously released by using a number of releasing cylinders. This type of device may be carried by universal joint mechanism such as is shown.

An arm 64, has an eye enclosing a rod 66, and at right angles with this rod a journal box 63 in which the ring 62 turns, and can be used as a means of hanging the device to a convenient support, which in practice is the roof of the cabin or any other part of the ship near the pack of the plane parachute. When used for this purpose, a very heavy weight 53 is not objectionable. A small hole 681 may be cut in the plate 67 to allow any air seeping past the seat 67 to escape.

In all three types, the essential elements are the same; a weight operating by the attraction of the earth's gravitation on it to put a stress upon an elastic element while the device is supported against this attraction, and moved by the resiliency of this elastic element when the device is falling freely. This weight causes a movable element to operate a part that trips or disengages an instrumentality substantially fixedly distanced from the part in which this moving part is contained and moves.

A very convenient way in which the speed of operation may be determined is to turn the device from an upright to a horizontal position. Ordinarily when an aviator jumps from an aircraft or an aircraft falls, my device will remain hanging vertically. This is unimportant because the device works just as well in any other position, (possibly a negligible air friction can exist). Many changes may be made in the construction of the device differing in arrangement and form from any of the three types particularly described without departing from my invention.

I claim:—

1. A parachute releasing device, automatically set in action by being allowed to fall freely, comprising a weight, an elastic element put into stress by said weight and sufficiently resilient to move said weight when the entire device is falling freely, and means for releasing said parachute set in motion through the movement of the weight caused by the resiliency of the said elastic element.

2. A parachute releasing device, automatically set in action by being allowed to fall freely, comprising a weight, guides for said weight, an elastic element, put into stress by the action of the earth's gravity on said weight while the device is held upright, but sufficiently resilient to move said weight along said guides when the device is falling freely, and means for releasing said parachute set in action by the movement of the weight along said guides, under the impulse of the resiliency of the elastic element.

3. A parachute releasing device, automatically set in action by being allowed to fall freely, comprising in combination an elastic element, a weight positioned in a guide relatively thereto to bring a stress upon the elastic element when the guide is positioned to bring the force of the earth's gravity into action on the weight, while the elastic element is supported against this force, the said elastic element being sufficiently resilient to cause it to move the weight when the device is falling freely, and means set in action through this movement, whereby the parachute is released.

4. A parachute releasing device, automatically set in action by being allowed to fall freely, comprising a weight, a spring put into stress by said weight, but sufficiently resilient to cause a relative movement of said spring and weight when the device falls freely, and mechanism operated by the movement of said weight for causing the release of said parachute.

5. The device as defined in claim 3 wherein the weight forms a piston in a container wherein the weight moves.

6. The device as defined in claim 4 wherein the weight is in the form of a piston and fits and moves in a container, and said container is closed at one end to cause the slowing up of the movement of the weight caused by the resiliency of the spring.

7. In a parachute releasing device automatically set in action by being allowed to fall freely, the combination comprising a tube having a closed end, in which a weight forms a movable piston, a seat for a spring carried by said tube, a spring extending from said weight to said seat, and releasing mechanism connected to said weight and said seat, and operated by the relative movement of said seat and spring when the device is falling freely.

8. In a device for releasing automatically the retaining instrumentalities of the pack of a parachute, set in action by falling freely, the combination of a tube, a weight movable longitudinally in said tube, and fitting closely therein, a spring extending between the weight and a fixed support in said tube, and held in a condition of stress by the action of the force of gravity exerted by the earth on the weight, when the tube is held upright and is supported against this force of gravity, and mechanism connected to said weight and to said tube disengaging the retaining instrumentalities when the stress on the spring ceases.

9. In a device for releasing automatically the retaining instrumentalities of the pack of a parachute set in action by falling freely, the combination defined in claim 8, in combination with a stopper in said tube, a port in communication with the area within the tube between the weight and the stopper, and covered by the weight when the latter is subjecting the spring to a stress, and uncovered by the movement of the weight when moved by the resiliency of the spring.

10. In a device for releasing automatically the retaining instrumentalities of the pack of a parachute, set in action by falling freely, the combination defined in claim 8, in combination with a universal joint mechanism from which the tube is suspended.

11. In a device for releasing automatically the retaining instrumentalities of the pack of a parachute, the combination defined in claim 8 wherein the mechanism connected to said weight and to said tube disengaging such instrumentalities comprises a spring actuated drum, a catch for holding the drum, and a detent movable in and out of engagement with said catch and secured to the weight.

12. A device for releasing automatically the retaining instrumentalities of the pack of a parachute, comprising in combination a tube, a universal joint mechanism from which the tube is suspended in upright position, a weight fitting closely, and movable lengthwise in said tube, a stopper for the upper end of said tube, a spring suspended in said tube below the stopper and connected to the top of the weight, and mechanism connected to said weight and to said tube and worked by the movement of said weight in said tube whereby the retaining instrumentalities of the pack are released when the device is falling freely.

13. The device as defined in claim 1 in combination with a braking mechanism retarding the movement caused by the resilient element while the device is falling freely.

14. The device as defined in claim 1 in combination with a braking mechanism, retarding the movement caused by the resilient element while the device is falling freely, and operative during a portion only of such movement.

MARK W. COLLET.